Patented Sept. 15, 1953

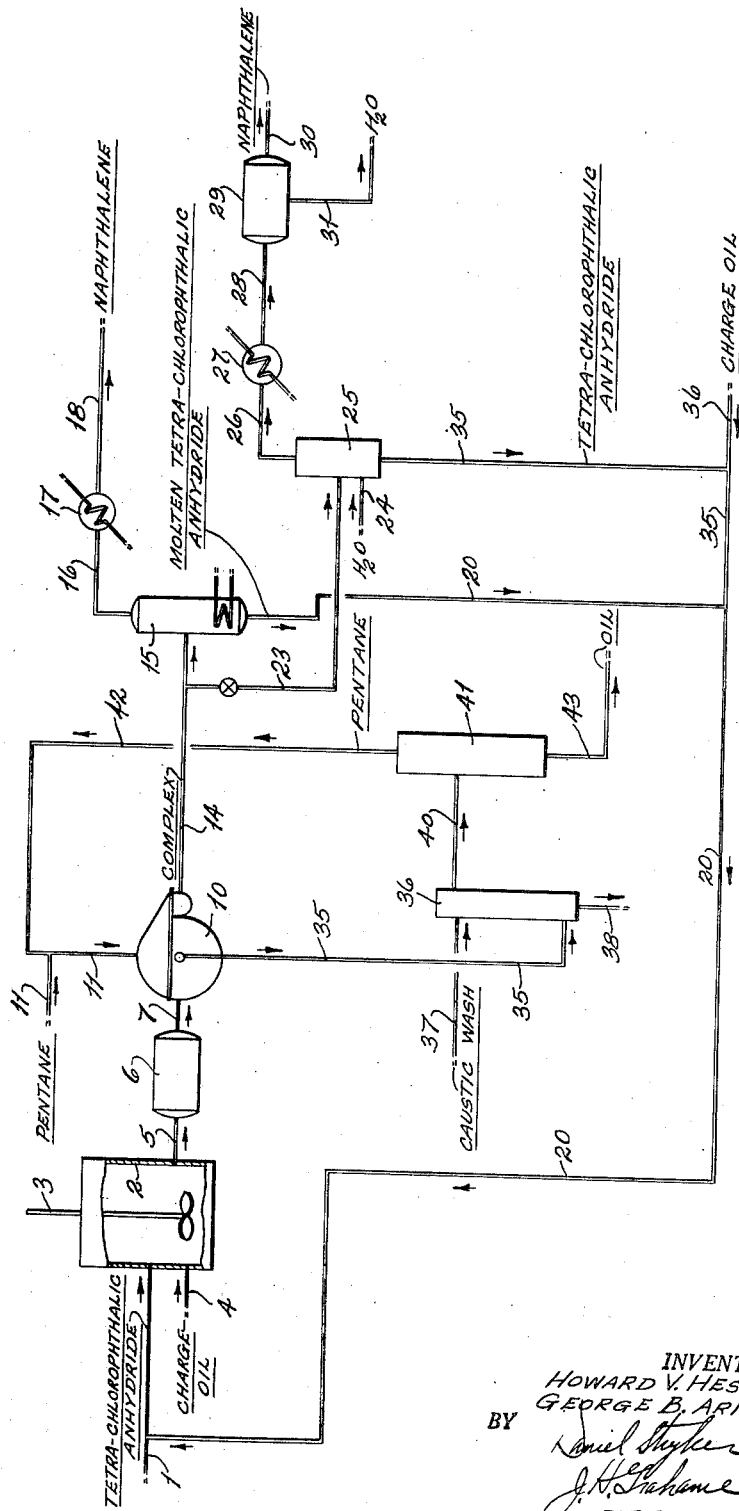

2,652,435

UNITED STATES PATENT OFFICE 2,652,435

PROCESS FOR SEPARATING POLYCYCLIC AROMATIC COMPOUNDS FROM ORGANIC MIXTURES

Howard V. Hess, Beacon, and George B. Arnold, Glenham, N. Y., assignors to The Texas Company, New York, N. Y., a corporation of Delaware Application November 14, 1949, Serial No. 127,202

5 Claims. (Cl. 260—674)

This invention relates to a process for separating polycyclic aromatic compounds from mixtures of other organic compounds. More particularly, this invention provides a method for separating polycyclic aromatics, particularly naphthalene compounds, from monocyclic aromatics and alkylated monocyclic aromatics.

In accordance with the process of this invention, fused polycyclic aromatics, homologs and substituted derivatives thereof are separated from aliphatic, naphthenic, monocyclic, aromatic and heterocyclic compounds by forming solid complexes of the polycyclic aromatic compounds with tetrahalophthalic anhydride. Crystalline complexes comprising mol for mol quantities of fused polycyclic aromatics and tetrahalophthalic anhydride are formed on contacting tetrahalophthalic anhydride with a polycyclic aromatic. Since the complex is substantially insoluble in hydrocarbons at atmospheric temperature, it is readily separated from the mixture of organic compounds with which the fused polycyclic aromatics were associated. After separation of the complex, polycyclic aromatics are recovered therefrom by heating the complex whereby it decomposes into its components which are separated from one another. Separation of the complex from hydrocarbon solutions is advantageously effected at a temperature below 150° F. and ordinarily at a temperature between 50 and 125° F. at which temperatures the complex is substantially insoluble in hydrocarbon solution. Decomposition of the complex into its components is effected at temperatures over 200° F. and ordinarily at a temperature between 250 and 500° F.

The process of the subject invention is particularly useful in separating naphthalene from monocyclic and alkylated monocyclic aromatic compounds. Naphthalene is an extremely important chemical of commerce and is in demand as a starting chemical for the production of phthalic anhydride and specialty solvents, such as, tetralin and decalin. Naphthalene itself has widespread use as a component of moth killing compositions. Heretofore, the main source of naphthalene has been coal tar. The recent huge increase in the use of alkyd resins of the phthalate type and in the use of vinyl plasticers of the phthalate ester type has created a huge demand for naphthalene. It is well known that certain cycle oils from thermal and catalytic cracking contain substantial quantities of naphthalene. However, its isolation therefrom has been difficult to achieve, since the normal modes of mixture resolution, such as, solvent extraction, azeotropic distillation and crystallization, do not effect satisfactory separation of naphthalenes from alkylated monocyclic aromatics having boiling points similar to naphthalene. This invention provides a method whereby naphthalene can be separated very simply and efficiently from cycle cracking oils. Naphthalene and homologs thereof separated by the process of this invention are of high purity and substantially free from alkylated monocyclic aromatics since tetrahalophthalic anhydride is a specific complexing agent for polycyclic aromatic compounds.

Tetrachlorophthalic anhydride, tetrabromophthalic anhydride, tetraioaophthalic anhydride and tetrafluorophthalic anhydride or mixtures thereof may be employed as the complexing agent in the process of this invention. Tetrachlorophthalic anhydride is ordinarily employed, however, since it is most available and cheapest of the tetrahalophthalic anhydrides. In further description of the invention, tetrachlorophthalic anhydride will ordinarily be used to exemplify the process of the invention.

The process of the application is applicable to the separation of polycyclic aromatics other than naphthalene from mixtures of organic compounds. For examples anthracene and phenanthrene form complexes with tetrahalophthalic anhydride. Moreover, homologs of polycyclic aromatic compounds, for example methylnaphthalene and ethylphenanthrene, and substituted polycyclic aromatics, for example alpha-chloronaphthalene, naphthol and anthraquinone, can be separated from mixtures of organic compounds by the process of the invention. Tetrahalophthalic anhydride is a specific complexing agent for polycyclic aromatics, homologs and derivatives thereof. It does not form complexes with heterocyclics, fused heterocyclics, such as dithienyl, aliphatics, monocyclic aromatics or homologs of monocyclic aromatics. The polycyclic aromatics which complex with tetrachlorophthalic anhydride are of the fused type. Polycyclic aromatics of the linear type, such as diphenyl, do not form complexes with tetrachlorophthalic anhydride.

The separation of polycyclic aromatics from mixtures wherein they are dissolved is effected by a simple procedure involving contacting the mixture with a tetrahalophthalic anhydride, separation of the formed complex and decomposition of the complex into its components.

The contacting step is effected with thorough mixing of the complexing agent and the mixture containing polycyclic aromatic compounds. A preferred method of insuring thorough contacting of the complexing agent with the polycyclic aromatic compounds is to contact organic mixture with complexing agent at a temperature above 300° F. and preferably at a temperature between 325 and 400° F.; at these temperatures the complexing agent is soluble in most hydrocarbon mixtures. Thorough mixing and contacting of the complexing agent with the polycyclic aromatic compounds is efficiently realized by dissolving the complexing agent in the hydrocarbon mixture. Upon cooling the mixture containing dissolved complexing agent to a temperature between 50 and 150° F., a complex of polycyclic aromatic and tetrachlorophthalic anhydride separates out as a golden yellow solid.

It is also feasible to effect complex formation by slurrying solid tetrachlorophthalic anhydride with thorough agitation in a polycyclic-containing mixture at atmospheric temperature. In such instances, longer contact time and more vigorous agitation is required in order to effect the same degree of separation that is effected by the procedure involving solution of the complexing agent at elevated temperature.

A third alternative involves liquid-liquid contact and comprises contacting a saturated solution of a complexing agent in a solvent, such as acetone, with the polycyclic aromatic-containing mixture. A drawback attendant on the use of the liquid-liquid type system is that presence of the solvent introduces a third component into the system whose recovery necessitates additional treating steps.

The complex is readily separated from the mixture of organic compounds. Filtration, decantation or centrifugal separators may be used to effect removal of the complex from the treated mixture. Filtration is the most commonly used method for effecting this separation. In large scale operations rotary filters, such as are employed in solvent dewaxing procedures employing methylethylketone-benzol solvent, provide a very efficient means for separating the complex from the treated mixture. Separation of the complex from the treated mixture is ordinarily effected at a temperature below about 150° F.; temperatures between about 50 and 125° F. have proven to be particularly effective for this separation.

After separation has been effected, it is advisable to wash the precipitate with a light hydrocarbon solvent, for example pentane in order to remove physically absorbed organic compounds from the complex. Pentane is an excellent wash solvent.

The separated complex is decomposed into its components by heating it to a temperature between 200 and 500° F. Several techniques may be employed to effect heat breaking of the complex. The preferred procedure involves straight heat stripping which comprises heating the complex to a temperature between about 250 and 500° F. whereby the complex is decomposed and the polycyclic aromatic is obtained as a distillate. The tetrahalophthalic anhydride in molten form is recycled to the contacting zone. Temperatures between 350 and 500° F. are ordinarily used in straight heat stripping.

Another alternative involves contacting the complex with steam at a temperature above about 300° F. whereby there is obtained a distillate comprising polycyclic aromatic and water. Tetrahalophthalic anhydrides are not hydrolyzed at temperatures above about 300° F. so that anhydride is recovered from the steam distillation for recycling to the contacting zone. This procedure provides a neat method of breaking the complex since both the polycyclic aromatic and tetrachlorophthalic anhydride are recovered in form for further use as polycyclic aromatic compounds are insoluble in the aqueous distillate.

A third procedure for separating the complex involves heating the complex in the presence of a solvent for polycyclic aromatics, such as naphtha, whereby the complex decomposes and there are formed two layers, one consisting of a complexing agent and the other of a soltuion of polycyclic aromatic in a solvent. A temperature of about 200° F. to 400° F. should be employed in order to decompose the complex with a solvent. Accordingly, if low boiling naphtha is used as a solvent, it may be necessary to use superatmospheric pressure in order to maintain the necessary decomposition temperature. The polycyclic aromatics can be separated from the naphtha solution by stripping.

In the accompanying drawing there is presented a flow diagram of a preferred procedure for effecting the process of the subject invention. For purposes of explanation, the process is applied to the separation of naphthalene from an oil such as cracked distillate.

Through pipe 1 tetrachlorophthalic anhydride is introduced into a mixing vessel 2 fitted with stirring means represented by propeller 3. In the mixing vessel 2, the complexing agent is contacted with charge oil which is introduced therein through a line 4. The mixing vessel 2 is maintained at a temperature of about 350° F. at which temperature tetrachlorophthalic anhydride dissolves in the cycle oil from which naphthalenes are to be separated.

After thorough mixing in the mixing vessel 2 the composite mixture of complexing agent and charge oil is introduced through a pipe 5 into a cooling vessel 6 wherein the treated mixture is cooled to a temperature below 150° F. and a solid complex of tetrachlorophthalic anhydride and naphthalenes settles out. The composite mixture advantageously at a temperature of about 50 to 150° F. is introduced through a pipe 7 into a rotary filter 10, wherein the complex is separated from the treated mixture by filtration. Means are provided in the rotary filter for continual removal of the complex from the filter drum. Means are also provided for continual washing of the complex cake on the filter drum with a hydrocarbon solvent, for example pentane, which is introduced into the rotary filter through a pipe 11. The complex is removed from the rotary filter 10 through a conduit 14 which can be equipped with a screw type conveyor in order to facilitate movement of complex therethrough.

The complex is introduced into a vessel 15 wherein it is heated to a temperature between 350 and 500° F. At this temperature the complex decomposes and naphthalene distills off as an overhead through the pipe 16 and passes through an exchanger 17 in which condensation of the naphthalene is effected. The naphthalene passes to storage or to further chemical reaction through a pipe 18.

Molten tetrachlorophthalic anhydride is withdrawn from the vessel 15 through a conduit 20 and is returned therethrough to the mixing vessel 2. In order to avoid crystallization of tetrachlorophthalic anhydride in the pipe 20, it is necessary to enclose pipe 20 in a steam jacket.

Moreover, in practice the mixing vessel 2 and the vessel 15 are situated near one another so that the pipe 20 is of very short length.

An alternative method of decomposing the complex is also shown in the drawing. This alternative procedure involves steam distilling the complex at a temperature of about 250 to 400° F. If this alternative procedure is employed, the complex is introduced through pipes 14 and 23 into a distillation vessel 25 into which superheated steam is introduced through a pipe 24.

The complex is decomposed on steam distillation at a temperature between 300 and 400° F., and there is obtained a distillate comprising steam and naphthalene, which is taken off overhead through a pipe 26. After condensation in the exchanger 27, the distillate is introduced into a separator 29 wherein naphthalene is separated from water. Water is withdrawn from the separator 29 through a pipe 31 and naphthalene is withdrawn from the separator 29 through a pipe 30.

Tetrachlorophthalic anhydride is withdrawn from the distillation vessel 25 through the pipe 35 and is recycled to the mixing vessel 2 through pipes 35 and 20. Charge oil can be introduced through a pipe 35 through a pipe 36 to act as a carrier for returning complexing agent to the mixing vessel 2 when decomposition of the complex is effected by steam distillation.

The filtrate obtained from filter 19 comprises cycle oil substantially free from polycyclic aromatics; it is withdrawn from the rotary filter 19 through a pipe 35 and is introduced into a wash tower 36. The wash liquor obtained by washing the complex with pentane is combined with the filtrate and flows into tower 36 through the pipe 35. Combined filtrate and pentane wash are contacted with dilute caustic, for example, 3 per cent sodium hydroxide in wash tower 36. The caustic is introduced into the tower 36 through a pipe 37. The caustic wash frees the oil of residual quantities of tetrachlorophthalic anhydride. The caustic wash is removed from the tower 36 through a pipe 38.

The washed oil is introduced through a pipe 40 into a stabilizer 41 wherein it is freed from pentane which is taken off overhead from the stabilizer 41 and is recycled through a pipe 42 to the rotary filter 19. The cycle oil freed of its content of polycyclic aromatics is removed from the stabilizer 41 through a pipe 43.

The following examples illustrate the recovery of naphthalenes from cracked distillate by the process of this invention.

*Example I*

A cracked distillate having a gravity of 0.8540 and having a total aromatic content of 50 weight per cent, of which naphthalene comprises 11 weight per cent and methylnaphthalenes comprise about 2 per cent and tetrachlorophthalic anhydride were mixed in the proportion of 264 pounds of tetrachlorophthalic anhydride to one barrel of cracked distillate. The composite was heated to a temperature of 350° F. and thoroughly agitated. Thereafter the composite mixture was cooled to a temperature below 150° F. whereupon a complex precipitated out; the mixture was filtered at about 90° F. and the precipitate was pentane washed. From the filtration there was obtained 285 pounds of precipitate per barrel of cracked distillate which analyzed 11.5 per cent naphthalenes. This precipitate was distilled with steam at a temperature of 350° F. whereby there was obtained a distillate from which there was separated 23.2 pounds of naphthalenes per barrel of cracked distillate. This naphthalene fraction contained 95 per cent naphthalene, 4 per cent alpha-methylnaphthalene and 1 per cent beta-methylnaphthalene. The combined filtrate and pentane wash was caustic washed and stripped. 37.8 gallons of oil per barrel of cracked distillate was obtained which contained no appreciable quantity of naphthalene. The oil treated in this way contained approximately 1.50 per cent tetrachlorophthalic anhydride; the oil could be further freed from tetrachlorophthalic anhydride by an additional caustic wash.

*Example II*

A cracked distillate having a total aromatic content of 48 weight per cent of which naphthalene comprises about 10.6 per cent and methylnaphthalenes comprise about 0.7 per cent, and tetrachlorophthalic anhydride in the proportion of 140 pounds of tetrachlorophthalic anhydride per barrel of cracked distillate was introduced into a mixing vessel maintained at 350° F. After thorough mixing the composite was cooled to a temperature below about 150° F. whereupon a solid complex precipitated out. The mixture was filtered and the precipitate was pentane washed to remove adsorbed oil from the complex. The precipitate was placed in a distillation vessel and distilled with superheated steam at a temperature of about 300° F. to decompose the complex. From the steam distillation there was obtained 36.1 pounds of material per barrel of cracked distillate; this material contained 93 per cent naphthalene, 2 per cent alphamethylnaphthalene and 2 per cent beta-methylnaphthalene. The oil obtained on filtration of the composite mixture amounted to 33 gallons per barrel of cracked distillate. After caustic washing, this filtrate oil contained 39 per cent aromatic content of which approximately 1 per cent was naphthalene and less than 0.5 per cent was combined alpha- and beta-methylnaphthalenes. The pentane wash was stripped and then caustic washed whereby there was obtained 3.9 gallons of oil per barrel of cracked distillate which had an approximate naphthalene content of 4 weight per cent and less than 0.5 per cent content of both alpha- and beta-methylnaphthalenes.

The high purity of the naphthalene isolated from the cracked distillates in the preceding examples is outstanding. In Example I the naphthalene cut contains approximately 100 per cent naphthalene plus methylnaphthalenes, and in Example II, the naphthalene cut analyzed approximately 97 per cent naphthalene plus methylnaphthalenes.

It will be recognized that the raffinate oil from which the complex is separated can be freed of the tetrachlorophthalic anhydride still remaining therein by simple fractionation. The tetrahalophthalic anhydrides have very high boiling points and are stable so that a distillate obtained by fractionation of the raffinate is free from tetrahalophthalic anhydride. In large scale operations this procedure is preferred to caustic washing.

Moreover, it is apparent that the process of the invention can be used either to isolate a valuable component such as naphthalene from a refinery stream or to free a petroleum fraction of polycyclic aromatics where their presence is detrimental to the intended use of the hydrocarbon fraction.

Obviously many modifications and variations of the invention, as hereinbefore set forth, may be made without departing from the spirit and scope thereof, and therefore only such limitations should be imposed as are indicated in the appended claims.

We claim:

1. A process for recovering fused polycyclic aromatic compounds and homologs thereof from mixtures containing such compounds in combination with similar boiling hydrocarbons which comprises contacting said mixture with tetrahalophthalic anhydride, forming a complex consisting mainly of said tetrahalophthalic anhydride and said fused polycyclic aromatic compounds, separating said complex in solid form at a temperature below 150° F. and decomposing said complex by contact with steam at a temperature between 300 and 500° F.

2. A process according to claim 1 in which tetrachlorophthalic anhydride is employed as the complexing agent.

3. A process according to claim 1 in which contact of tetrahalophthalic anhydride with fused polycyclic aromatic-containing mixture is effected by dissolving the tetrahalophthalic anhydride in the mixture at temperatures above 300° F. and thereafter cooling the mixture to a temperature below about 150° F.

4. A process for recovering fused polycyclic aromatic compounds, homologs and substituted derivatives thereof from mixtures containing such compounds in combination with monocyclic aromatics, which comprises contacting said mixtures with tetrahalophthalic anhydride, forming a complex consisting mainly of said tetrahalophthalic anhydride and said fused polycyclic aromatic compounds, separating said complex in solid form at a temperature below 150° F., decomposing said complex by contact with steam at a temperature between 300 and 500° F. to yield a steam distillate and separating said fused polycyclic aromatic compounds from said steam distillate.

5. A process for recovering fused polycyclic aromatic compounds and homologs thereof from mixtures containing such compounds in association with alkylated monocyclic aromatic hydrocarbons which comprises contacting said mixture with tetrachlorophthalic anhydride at a temperature above 300° F., cooling said mixture to a temperature below 150° F. whereby a solid complex consisting mainly of said tetrachlorophthalic anhydride and said fused polycyclic aromatic compounds is formed, separating said solid complex, decomposing said complex by contact with steam at a temperature between 300 and 500° F. into tetrachlorophthalic anhydride and a steam distillate, recovering said fused polycyclic aromatics from said steam distillate and recycling said tetrachlorophthalic anhydride to contact said mixture.

HOWARD V. HESS.
GEORGE B. ARNOLD.

References Cited in the file of this patent

UNITED STATES PATENTS

| Number | Name | Date |
| --- | --- | --- |
| 2,347,228 | Winans | Apr. 25, 1944 |
| 2,440,688 | Insinger | May 4, 1948 |
| 2,489,042 | Medcalf et al. | Nov. 22, 1949 |

OTHER REFERENCES

Pfeiffer et al.: Berichte, 55B, 413–29 (1922), vol. 16, abstracted in Chem. Abstracts, pages 2483–4 (1922).